Patented Aug. 6, 1940

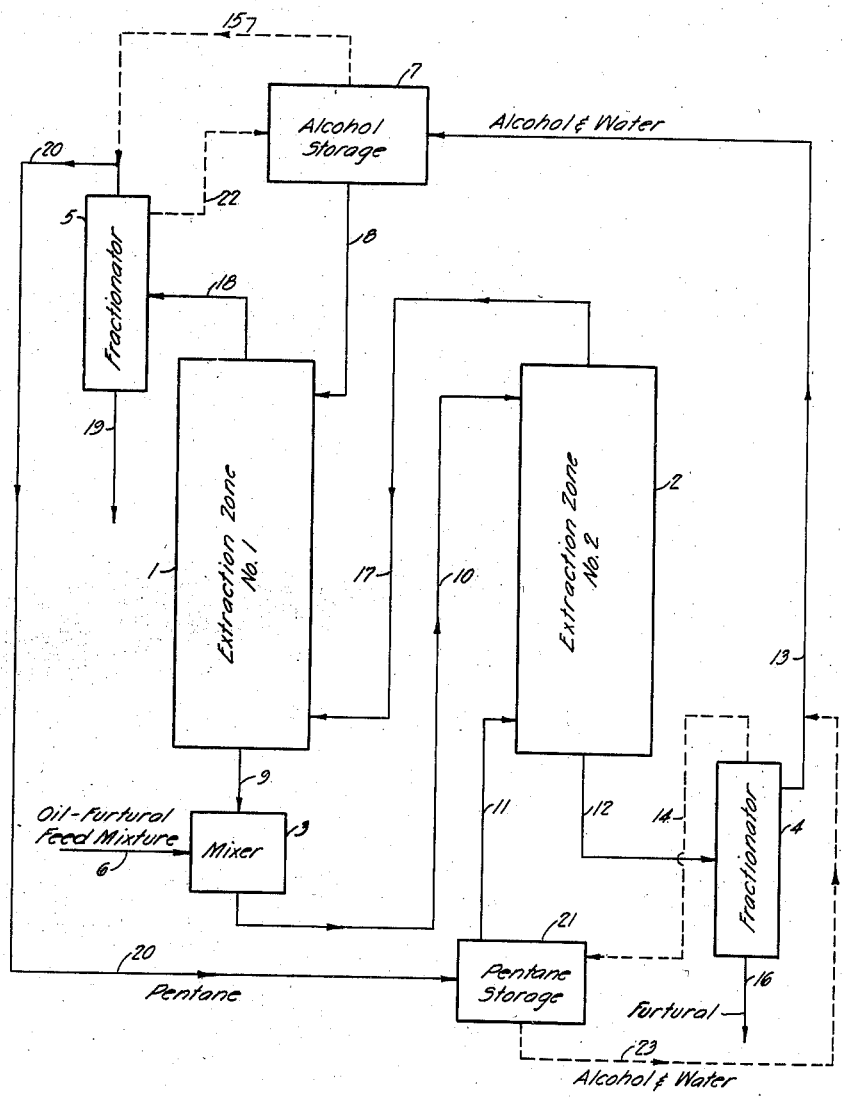

2,210,541

UNITED STATES PATENT OFFICE 2,210,541

METHOD OF RECOVERING SELECTIVE SOLVENTS

Sijbren Tijmstra, Berkeley, Calif., assignor to Shell Development Company, San Francisco, Calif., a corporation of Delaware Application May 7, 1935, Serial No. 20,163

8 Claims. (Cl. 196—13)

The present invention relates to the art of refining mineral oils and more specifically comprises an improved method for the recovery of selective solvents used in the extraction of hydrocarbon oils.

In the various extraction processes applied to separate hydrocarbon mixtures into their components the quantitative recovery of the solvent is dictated by the cost of the solvent, and/or the required purity of the separated portions. To accomplish this recovery by distillation is, however, often very difficult and costly because sometimes the boiling points of the solvent and of the mixture are such a separation by distillation is difficult and often impossible. Moreover, even when the boiling points are different, recovery of the solvent by distillation cannot, in many cases, be effected without the formation of decomposition, polymerization, or reaction products of the hydrocarbon and solvent. This difficulty is due to the fact that use is often made of solvents which have high-boiling temperatures and are, therefore, difficult to separate from the separated portions of the hydrocarbon mixture and/or which react with the hydrocarbons and/or decompose upon the application of heat, causing the formation of undesirable end products which are difficult to remove from the hydrocarbons and/or loss of the solvent. These undesirable reaction or decomposition products may often have an adverse influence upon one or both of the end products of the extraction process. In the recovery of these solvents by distillation it has heretofore been necessary to use a high vacuum and to control the temperature very carefully.

It has been proposed to recover such solvents as furfurol from an oil by washing the oil-furfurol mixture with a light naptha. This failed to effect complete recovery of the solvent and necessitated the further treatment of the oil with sodium bi-sulphite to remove residual furfurol.

It is an object of my invention to provide a process for the quantitative removal of a selective solvent from a liquid hydrocarbon which will produce a substantially solvent-free hydrocarbon, which will be economical to operate, and which will receive substantially all of the solvent in a form in which it may be reused. Other objects will be apparent from a reading of this specification.

In accordance with my invention I contact a mixture of solvent and hydrocarbons with an extracting agent which is a preferential solvent for the solvent contained in the said mixture under conditions causing the formation of two liquid phases, separate the phases and treat the phase containing the extracting agent and the solvent to separate it into its components, as by distillation. I have moreover, found that a more efficient separation can be obtained by employing an auxiliary extracting agent to remove oil from this solvent phase. Thus, I prefer to treat the mixture of solvent and hydrocarbons in a double countercurrent operation with a primary extracting agent having a selective solubility for the solvent and an auxiliary extracting agent having a high solubility for the hydrocarbons, the two agents being readily removable from the solvent and the hydrocarbons by distillation.

My invention may be understood more fully by reference to the accompanying drawing, which is a flow-sheet illustrating a preferred embodiment of my invention employing two extracting agents, although it is understood that I may operate my process with a single extracting agent. For convenience, the solvent which is to be removed from the oil is referred to as furfural, and the main and auxiliary extracting agents are referred to as aqueous alcohol and pentane, respectively, although it is understood that my invention may be used in connection with other solvents and/or extracting agents than those specifically mentioned. In the drawing, 1 and 2 are extraction apparatus, each of which may be a countercurrent extraction apparatus, or series of mixing and settling devices or centrifuges; 3 is a mixing device, such as a mixing valve, or an agitator; and 4 and 5 are fractionating apparatus, all interconnected with conduits, as shown, and provided with pumps, valves, heat exchangers, and other adjuncts, not shown. The oil-solvent mixture to be separated is introduced into mixer 3 through inlet 6. This mixture may be either the raffinate or the extract phase produced in a solvent extraction process and the solvent may, for example, be furfurol. A liquid in which the solvent is preferentially soluble, such as aqueous 45% ethyl alcohol, flows from a tank 7 through a conduit 8, contacts the liquid in the apparatus 1, is withdrawn through an outlet 9, and is mixed with the oil solvent mixture in the mixer 3. The resulting liquid mixture is introduced into the apparatus 2 by a conduit 10 where it separates into a lighter oil phase and a heavier phase consisting mainly of alcohol, water, and furfurol, but containing a small amount of oil. An extracting agent in which the oil is soluble and from which it may be readily separated by distillation, such as light naphtha or pentane, is introduced into the apparatus 2 through a conduit 11, and is caused to flow countercurrently to the latter phase, thereby washing out substantially all of the oil. The washed heavy phase from the apparatus 2 is withdrawn at 12, and consists mainly of alcohol, water and furfurol, but may contain a small amount of pentane. This phase is fractionated in the apparatus 4, from which the alcohol, water and pentane are removed through a conduit 13, and returned to tank 7. The pentane can, however, be separately withdrawn from the fractionator 4, as by a conduit 14. If the pentane is withdrawn through the conduit 13, it may be separated from the alcohol by decantation after permitting the mixture to stratify in a suitable settling zone. The tank 7 may be employed for this purpose, and the pentane may be removed from it by a conduit 15. The furfurol still containing water is withdrawn through a conduit 16 and may be further purified by distillation and then be reused to treat additional oil, or may be disposed of in any desired manner.

The oil phase formed in the apparatus 2 consists primarily of pentane and oil, together with a small quantity of furfurol, the water and alcohol being almost insoluble in this phase. This phase is conducted through a conduit 17 to the apparatus 1, where it flows countercurrently to the alcohol and water introduced through the conduit 8, resulting in the formation of a heavy phase consisting of alcohol, water, and furfurol, which is withdrawn through the conduit 9, and a light phase consisting substantially of oil and pentane, which is withdrawn through a conduit 18 and fractionated in the apparatus 5. Substantially pure oil is withdrawn at 19, and pentane is withdrawn through a conduit 20 and recycled to a pentane storage tank 21. Traces of water and alcohol which may be introduced into the fractionator 5 with the light phase may be taken off separately therefrom, as through a conduit 22, or may be carried through conduit 20 to the tank 21, where the aqueous alcohol settles, and can be withdrawn through a conduit 23.

I am not restricted to the use of distilling apparatus at 4 and 5 for the recovery of the pentane or alcohol. For example, I may use gas contact devices, and vaporize the volatile constituents with a current of gas, either at room temperature or at elevated temperatures. A series of such units operating at different temperatures may be employed.

The oil-solvent mixture introduced at 6 may or may not have been previously concentrated, as by distilling off a portion of its solvent.

If a sufficient amount of water is present, the mixture which leaves the mixer 3, after it is introduced into a column 2, will separate into three layers as follows: (a) a light phase consisting mainly of oil, pentane, with smaller amounts of alcohol, water and pentane; (b) an intermediate phase consisting mainly of alcohol and water, with a small amount of furfurol; (c) a heavy phase consisting mainly of furfurol and alcohol, but containing smaller amounts of water and oil. The intermediate phase can be avoided by using a smaller proportion of water. I have, however, found that the efficient removal of furfurol is aided by the use of large amounts of water. For this reason, I prefer to use the greatest quantity of water which will not cause the formation of three phases. The permissible amount is governed by the temperature of treatment, the relative quantities of the oil, alcohol, and pentane, and on the nature of the oil. In one installation I found that aqueous 45% ethyl alcohol was most efficient. The proper amount of water may be maintained by adding water to the tank 7 or mixer 3 from time to time.

It should be noted that my invention may be operated without the mixer 3, since it is possible to introduce the oil-furfurol mixture into any intermediate stage of a multi-stage treater or into an intermediate point of a single countercurrent column. Moreover, the use of pentane is not always essential. If pentane is not used, the apparatus 2 can be replaced by a simple settling zone. The process may be carried out at any desired temperature and pressure, either above or below standard conditions.

In order to more fully describe the invention, as applied without the use of the auxiliary extracting agent, the following examples are set forth:

*Example I.*—A dewaxed and deasphaltized Ventura oil was extracted in a double countercurrent process with a furfural-benzol mixture as the main solvent and iso-pentane as the auxiliary solvent, the volume ratios of oil to iso-pentane, furfural, and benzol being, respectively, 1:3.7:6.7:3.4, to produce raffinate and extract phases. The raffinate phase was then extracted five times with 30% by volume of 1:1 ethyl alcohol and water to remove furfural, air blown at room temperature to remove the bulk of the iso-pentane, and finally air-blown at 90–110° C. until the oil showed a flash point of 415° F. The resulting oil was free from furfural. The furfural was separated from the alcohol by distillation and used for the further extraction of oil.

*Example II.*—The extract phase from the main extraction process of Example I was distilled at atmospheric pressure to about one sixth of its original volume, and iso-pentane, benzol, and furfural were recovered. The residue, still consisting of about 90% furfural, was extracted five times with equal volumes of 1:1 ethyl alcohol and water to remove furfural. The iso-pentane was removed from the oil by air blowing and heating to 90–110° C., and the furfural was recovered from the alcohol by distillation.

My process may also be applied to recover other solvents, such as phenol, aniline, quinoline, iso-quinoline, dimethyl sulphate, pyridine, quinaldine, and other substantially pure or industrial solvents. These specific solvents represent, however, only typical examples of a large number of known selective solvents which may be used to separate a hydrocarbon mixture into its components by solvent extraction, which solvents are intended to be within the scope of this invention.

I may employ extracting agents other than alcohol and pentane. The primary extracting agent must be more miscible with the selective solvent than with the oil. In other words, it must preferentially dissolve the selective solvent in the hydrocarbon-solvent mixture and be capable of forming a separate layer when mixed with the hydrocarbons. It should, moreover, preferably but not necessarily, have boiling point which is lower than that of the said solvent to facilitate the final separation of the hydrocarbons and the primary extracting agent in the fractionator 5. There are many of such primary extracting agents, which may be employed in my process, either with or without the aid of secondary extraction agents, and either with or without dilution with water to reduce the solubility in oil, as explained above in connection with ethyl alcohol. A few of these are: non-hydrocarbon aliphatic or aromatic derivatives, such as methyl alcohol, acetone, acetic acid, trichloracetic acid, phenol liquifactum, aniline, nitroanilines, naphthols, toluidine and naphthylamines. I have, however, found that aqueous ethyl alcohol to be the most useful, in that it is excellent for separating the hydrocarbons and the selective solvents commonly employed in the extraction of hydrocarbon oils, and is easy to recover by distillation.

The secondary or auxiliary extracting agent should preferably have a low boiling point, different from that of the primary extracting agent, and must be more miscible with the hydrocarbons than the primary extraction agent.

This last stated requirement may be expressed as follows: When a mixture of hydrocarbon H and solvent S is contacted with a primary extracting agent P and an auxiliary extracting agent A, two liquid phases are formed. The components H and S will in general be present in both phases, and the distribution between these phases may be expressed:

$$\frac{H_P}{H_A}=K_1$$

$$\frac{S_P}{S_A}=K_2$$

where $H_P$ and $S_P$ represent the concentrations of the hydrocarbons and the selective solvents, respectively, in the phase rich in the primary extracting agent P, and $H_A$ and $S_A$ represent the concentrations of the same components, respectively, in the auxiliary extracting agent A. According to my invention the auxiliary extracting agent must be selected so that $K_2$ is greater than $K_1$. As used in the present specification and claims, the expression that the auxiliary extracting agent is more miscible with the hydrocarbons than the primary extracting agent is to be interpreted to mean that $K_2$ in the above expression is greater than $K_1$, regardless of the relationship between the actual solvent powers of these two extracting agents for hydrocarbons.

Suitable auxiliary extracting agents are: light naphtha, propane, butanes, pentanes, hexanes, natural gasoline, gasoline, kerosene, especially paraffinic kerosenes and gasolines, as well as benzene non-hydrocarbons like ether which are not preferentially dissolved by selective solvents used to separate oil into paraffinic and non-paraffinic fractions. The auxiliary extracting agent should be capable of forming two liquid phases when mixed with the primary extracting agent, i. e., it must be at least partially immiscible therewith. It may, however, be completely miscible with the hydrocarbon-selective solvent mixture although I prefer to use a paraffinic hydrocarbon like pentane which is not miscible with the said mixture.

My process is, therefore, not to be restricted to the recovery of any specific solvent disclosed, nor to the use of the specific extracting agents disclosed, but is to be applied broadly to the treatment of any liquid solvent whether it be pure compounds or mixtures of two or more substances and whether the solvent occurs in a hydrocarbon mixture which constitutes either of the phases produced by the extraction of hydrocarbon mixtures or in any other similar mixture. My invention is not to be limited by any theory of the process nor by any example given merely by way of illustration.

I claim as my invention:

1. A process for separating a liquid hydrocarbon mixture into its components comprising the steps of extracting said mixture with a selective solvent to produce two liquid phases of different composition, separating said phases, distilling off a portion of the selective solvent from one of said phases, and recovering the selective solvent remaining in the residual portion of said phase by bringing said residual portion into contact with two counterflowing at least partially immiscible extracting agents, one of which agents is more miscible with the selective solvent than with the hydrocarbons, causing the formation of an oil phase and a solvent phase consisting predominantly of the selective solvent and said agent which is more miscible with the selective solvent, separating said last named phases, and separating selective solvent and said agent contained in said solvent phase.

2. In a process for removing a selective solvent from a mixture of said solvent and oil, the steps of introducing a first extracting agent which is more miscible with the selective solvent than with the oil into a first contact zone, withdrawing a heavier phase from said first contact zone, combining the mixture to be separated with said heavier phase, introducing the resulting mixture into a second contact zone, and contacting it in said second zone with a second extracting agent which is more miscible with the oil than the first extracting agent, thereby producing a plurality of phases in the second contact zone, separately withdrawing the phases from said second contact zone, introducing the lighter of said phases into the first contact zone and contacting it with said first extracting agent, thereby producing a plurality of phases in said first contact zone, and withdrawing the lighter of said phases.

3. In a process for removing a selective solvent from a mixture of said solvent and oil, the steps of introducing a mixture of water and a lower aliphatic oxygenated hydrocarbon into a first contact zone, withdrawing a heavier phase from said first contact zone, combining the mixtures to be separated with said heavier phase, introducing the resulting mixture into a second contact zone, and contacting it in said second zone with a light liquid hydrocarbon having a boiling range below that of the said oil, thereby producing a plurality of phases in the second contact zone, separately withdrawing the phases from said second contact zone, introducing the lighter of said phases into the first contact zone, and contacting it with said aqueous oxygenated hydrocarbon, thereby producing a plurality of phases in said first contact zone, withdrawing the lighter of said phases, and fractionating said light phase to recover the oil.

4. In a process for removing a furfural from a mixture of furfural and oil, the steps of introducing a mixture of water and ethyl alcohol into a first contact zone, withdrawing a heavier phase from said first contact zone, combining the mixture to be separated with said heavier phase, introducing the resulting mixture into a second contact zone, and contacting it in said second zone with a light hydrocarbon having a boiling range below that of the said oil, thereby producing a plurality of phases in the second contact zone, separately withdrawing the phases from said second contact zone, introducing the lighter of said phases into the first contact zone and contacting it with said aqueous ethyl alcohol, thereby producing a plurality of phases in said first contact zone, and withdrawing the lighter of said phases.

5. In a process for removing a solvent from a mixture of said solvent and oil, the steps of introducing a mixture of water and a lower aliphatic oxygenated hydrocarbon into a first contact zone, withdrawing a heavier phase from said first contact zone, combining the mixture to be separated with said heavier phase, introducing the resulting mixture into a second contact zone, and contacting it in said second zone with pentane, thereby producing a plurality of phases in the second contact zone, separately withdrawing the phases from said second contact zone, introducing the lighter of said phases into the first contact zone and contacting it with said aqueous oxygenated hydrocarbon, thereby producing a plurality of phases in said first contact zone, and withdrawing the lighter of said phases.

6. In a process for removing a solvent from a mixture of said solvent and oil, the steps of treating said mixture in double countercurrent extraction with countercurrent streams of an aqueous solution of a lower aliphatic oxygenated hydrocarbon and a light liquid hydrocarbon having a boiling range below that of the said oil, said aqueous solution being at least partially miscible with the selective solvent and containing sufficient water to be less miscible with the oil than with the selective solvent; thereby forming a plurality of phases, the phase rich in said aqueous solution containing substantially no oil and separately withdrawing said phases.

7. In a process for removing a solvent from a mixture of said solvent and oil, the steps of treating said mixture in double countercurrent extraction with countercurrent streams of an aqueous solution of a lower aliphatic oxygenated hydrocarbon and a light liquid paraffinic hydrocarbon having a boiling range below that of the said oil, said aqueous solution being at least partially miscible with the selective solvent and containing sufficient water to be less miscible with the oil than with the selective solvent; thereby forming a plurality of phases, the phase rich in said aqueous solution containing substantially no oil, separately withdrawing said phases, and fractionating the lighter of said phases to recover oil.

8. In a process for removing furfural from a mixture of furfural and oil, the steps of treating said mixture in double countercurrent extraction with countercurrent streams of an aqueous solution of ethyl alcohol and a light liquid paraffinic hydrocarbon having a boiling range below that of the said oil, said aqueous solution being at least partially miscible with the selective solvent and containing sufficient water to be less miscible with the oil than with the selective solvent; thereby forming a plurality of phases, the phase rich in said aqueous solution containing substantially no oil and separately withdrawing said phases.

SIJBREN TIJMSTRA.